Sept. 20, 1955 A. E. IKE 2,718,063
INSTRUMENT FOR MEASURING LENGTHS AND ANGLES
Filed Feb. 17, 1953 3 Sheets-Sheet 1
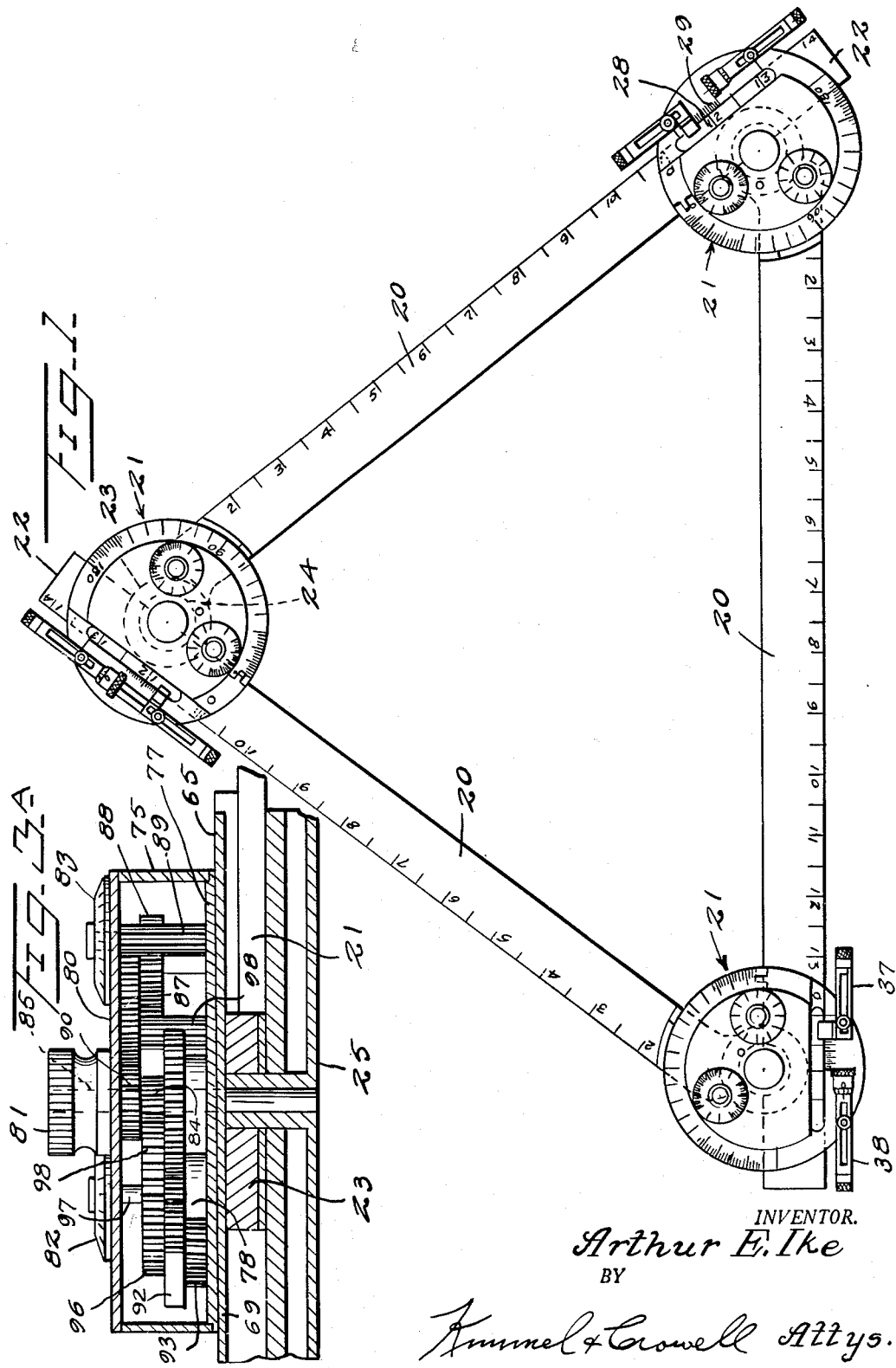
INVENTOR.
*Arthur E. Ike*
BY
*Kimmel & Crowell* Attys.

Sept. 20, 1955 A. E. IKE 2,718,063
INSTRUMENT FOR MEASURING LENGTHS AND ANGLES
Filed Feb. 17, 1953 3 Sheets-Sheet 2
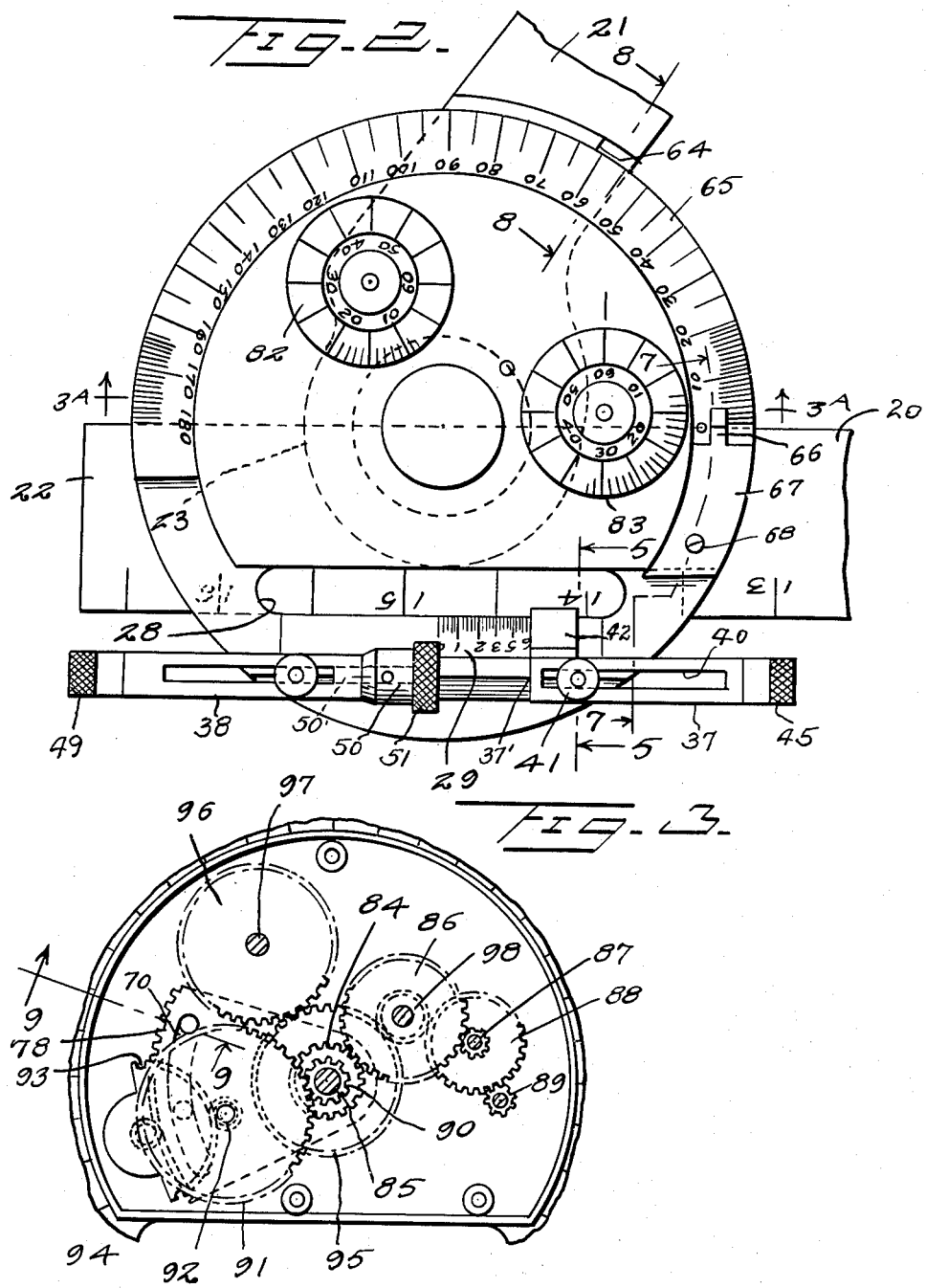
INVENTOR.
Arthur E. Ike
BY
Kimmel & Crowell Attys.

Sept. 20, 1955  A. E. IKE  2,718,063
INSTRUMENT FOR MEASURING LENGTHS AND ANGLES
Filed Feb. 17, 1953  3 Sheets-Sheet 3
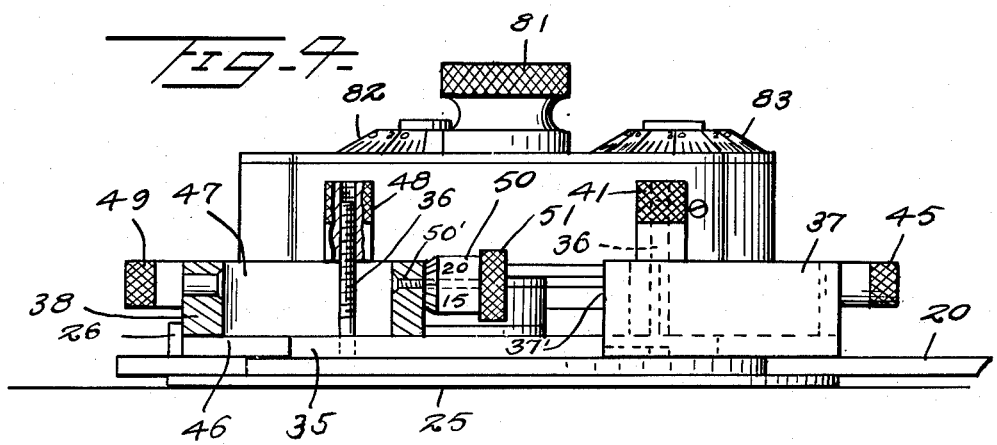
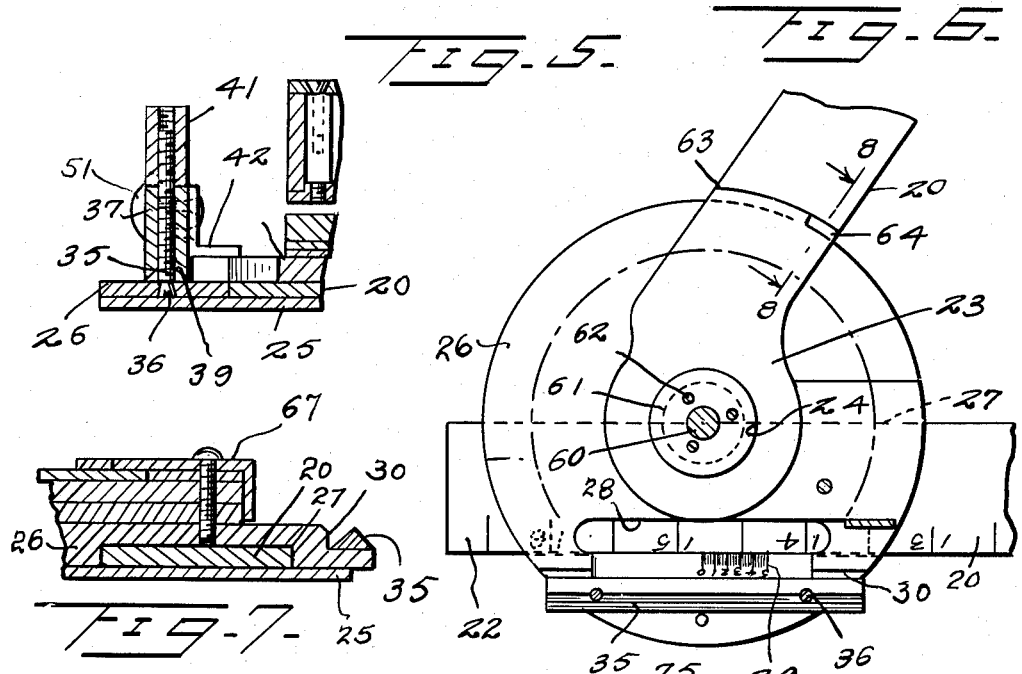
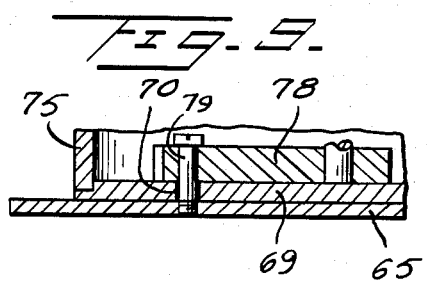
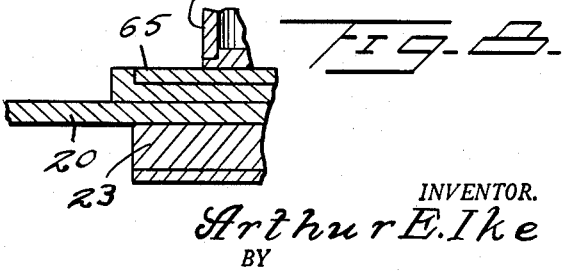
INVENTOR.
Arthur E. Ike
BY
Kimmel & Crowell Attys.

United States Patent Office 2,718,063
Patented Sept. 20, 1955

2,718,063

INSTRUMENT FOR MEASURING LENGTHS AND ANGLES

Arthur E. Ike, Sidney, Ohio

Application February 17, 1953, Serial No. 337,318

4 Claims. (Cl. 33—98)

This invention relates to an instrument for measuring lengths and angles and while it is particularly adapted for solving problems in geometry and trigonometry, it may be used whenever it is desired to very accurately measure a straight line or lay off triangles or other figures formed by lines extending in minutely computed angular relation to each other.

One object of the invention is to provide a measuring instrument including linear measures so associated with each other that they may be adjusted to permit a straight line to be very accurately measured and also so adjusted that cooperating measures extending in crossed and intersecting relation to each other may be moved into desired angular relation to each other and secured in the set position.

Another object of the invention is to provide improved means for slidably and pivotally connecting cooperating or companion linear measures so constructed that when one is slid longitudinally of the other to an adjusted position for measuring a straight line of a desired length, the distance may be measured not only in inches or relatively large fractions thereof, but also measured in minute fractions of an inch such as one or more thousandths of an inch.

Another object of the invention is to provide improved means for pivotally connecting linear measures for angular adjustment relative to each other, the said means being so constructed that one linear measure may be not only easily moved to an angle of a predetermined number of degrees relative to the other, but also the angle computed in minutes and seconds, as well as degrees.

Another object of the invention is to provide the means for slidably and pivotally connecting the linear measure with improved means for computing one or more thousandths of an inch and also with improved means for registering minutes and seconds and thus permit adjustments for thousandths of an inch or minute portions of degrees to be very accurately laid off and likelihood of errors eliminated. It will thus be seen that with this improved instrument, a triangle having the lengths of two of its sides and the angular relation thereof to each other may be easily laid off with great accuracy and the length of the third side of the triangle and its angular relation to the other two sides ascertained with equal accuracy.

A still further object is the provision of a device of this nature which comprises an improvement on my prior Patent No. 2,093,048, dated September 14, 1937, for Instrument for Measuring Lengths and Angles, whereby the arrangement of parts is so simplified that simultaneous readings of lengths and angles may be effected without reversing or turning the instrument over.

Still another object is the provision of a simplified device of the nature disclosed in my prior patent.

Still other objects will in part be obvious and in part be pointed out as the description of the invention proceeds, and shown in the accompanying drawings.

In the drawings:

Figure 1 is a top plan view of one form of device embodying features of the instant invention, Figure 2 is a top plan view of one of the mounting elements for the linear measures, Figure 3 is a top plan view of the gear box with the top cover plate and dials removed therefrom, Figure 3A is a vertical sectional view taken substantially along the line 3A—3A of Figure 2, as viewed in the direction indicated by the arrows, Figure 4 is a side elevational view of the construction shown in Figure 2, Figure 5 is a fragmentary sectional view taken along the line 5—5 of Figure 2, as viewed in the direction indicated by the arrows, Figure 6 is a top plan view of one of the mounting elements with the gear box structure removed, Figure 7 is a sectional view taken substantially along the line 7—7 of Figure 2 as viewed in the direction indicated by the arrows, Figure 8 is a fragmentary sectional view taken along the line 8—8 of Figure 2 as viewed in the direction indicated by the arrows, Figure 9 is a sectional view taken on the line 9—9 of Figure 3, as viewed in the direction indicated by the arrows.

Similar reference characters refer to similar parts throughout the several views of the drawings.

Referring now to the drawings in detail, and more particularly to Figure 1, there are provided three linear measures, each of identical construction, and each designated by the reference character 20. These markers are arranged in triangular form and connected in a manner to be described more fully hereinafter, with mounting elements each generally indicated at 21, the mounting elements being substantially identical.

Each linear rule 20 is graduated along its edges in any suitable manner, with the illustrative embodiment, shown in inches and in fractions thereof, and each rule 20 is provided with a straight end 22 and an arcuate end 23, having a central aperture 24 to permit its connection with one of mounting elements 21.

Having reference now to the mounting elements 21, each includes a bottom plate 25 and a base 26 suitably secured thereto in any desired manner, as by means of screws or the like. The base 26 is provided with a slot or groove 27 extending transversely thereacross adapted for the reception of the straight end 22 of one of rules or linear measures 20.

Adjacent the slot or groove 27 there is provided a recessed notch 28 through which the indicia on the linear measure becomes visible, and on the side of such slot or notch there is provided a scale plate 29 (see Fig. 2). The rule if provided with indicia in inches is adapted to be aligned with the scale which is divided into 25 graduations totalling one-half inch.

Adjacent the scale plate 29 there is provided a notch 30 in the base 26 upon which is secured in any desired manner an elongated triangular bar 35. The securing means preferably take the form of elongated screws 36 which extend upwardly therefrom and are adapted for the retention of a pair of slidable verniers 37 and 38 respectively.

Referring first to vernier 37, the same is provided with a V-shaped bottom groove 39 adapted to move slidably along the V-shaped bar 35 and also has a vertically positioned longitudinally extending channel 40 through which extends one of screws 36. The screw 36 is provided with a cap nut 41 which may be utilized to clamp against the top of the vernier 37 to hold the same in position.

As best shown in Figure 5, the vernier 37 carries an L-shaped indicator 42 which is adapted to ride along the scale 29 upon release of the cap nut 41. An operating handle member comprising a knurled knob 45 extends outwardly from the end of the vernier 37.

Having reference now to the vernier 38, there is provided in general the same arrangement of V-shaped bottom groove 46 and longitudinally extending channel 47 through which extends one of screws 36, provided with a cap nut 48. The vernier 38 also has an operating knob 49 at the end thereof. Vernier 38 is provided at the end adjacent vernier 37 with a micrometer arrangement, including a turnable knob 50 having a knurled head 51 and being mounted on a screw 50' having a pitch of, in this embodiment, forty threads to the inch. The screw 50' is threaded through the vernier 38 and extends outwardly therefrom. The micrometer is divided into 25 graduations. It will thus be seen that when the rule 20 is moved in its associated slot to the desired rough measurement, that a more accurate measurement may be taken by adjusting the vernier 37 to a suitable position along the scale plate 29, whereupon the position of pointer 42 will indicate the length in twenty-five one thousandths of an inch. If now the vernier 38 is moved into position adjacent the milled end 37' of the vernier 37 so the micrometer 50 abuts the same, and locked in position, the vernier 37 moved away, and the micrometer 50 suitably adjusted, and the vernier 37 then moved back into abutting relation with the knurled end of micrometer 50, the resultant reading may be had in thousandths of an inch of length.

Referring now to the angle measuring means, the ringed end 23 of each of linear members 20 is secured in pivotal relation to the top of the base 26, by means of a central pivot point 60 extending through the aperture in this end of the linear measure 20 and secured in position by a bevelled plate 61 secured to the base as by means of screws 62. Each of linear members 20 is permitted to move freely on base 26 and is provided with an arcuate flange 63 having a raised end 64 with an index line marked thereon.

Adapted to overlie each linear measure 20 and to be moved in a manner to be more fully described hereinafter, is a scale plate 65 against which the index mark on the raised end 64 may be suitably positioned. The scale plate 65 is marked from zero degrees to 180 degrees and the index mark on the raised end 64 of each linear measure 20 may be suitably positioned at any one of these degrees. The scale plate 65 is adapted to be moved through an arc of one degree if desired and is set against a zero mark 66 carried by a plate 67 suitably mounted on the top of base 26 as by means of a screw 68 or the like.

Attached to the top of scale 65 is a base plate 69 having an arcuate slot 70 extending therethrough (see Figures 3 and 9). A gear box generally indicated at 75 is carried by the plate 69 and contains a gear train to be more fully described hereinafter.

Gear box 75 is comprised of a base plate 77 which carries affixed thereto a sector gear 78 which sector gear is connected by means of a pin 79 extending through the slot 70 to the scale plate 65, whereby movement of the sector gear will move the scale plate.

A top plate 80 of gear box 75 has mounted thereon a control knob 81, a minute indicator 82, and a second indicator 83. The arrangement and operation of the gear train is as follows. A suitable gear 84 is mounted on the supporting post 85 of control knob 81 and meshes with a gear 86 which drives a pinion 87, which in turn drives a gear 88 which drives a second pinion 89 upon which is mounted the second dial 83.

Rotation of the shaft 85 also drives a pinion 90 which meshes with a gear 91. The gear 91 in turn drives a pinion 92 which engages a quadrant gear 93 for driving a pinion 94 which in turn moves the sector gear 78 previously referred to, the latter for the purpose of moving the scale plate. The drive for the minute dial 82 comprises a gear 95 driven by a pinion 98 which meshes directly with a gear 96 mounted on shaft 97 which carries the minute dial 92.

By the arrangement of gearing above described, it will be understood that by turning the control knob 81 the gear train rotates the second dial and the gearing ratio is such that for each full rotation of the second dial 83 the minute dial 82 is moved one minute. Correspondingly, a full rotation of the minute dial of sixty minutes will move the scale plate one full degree through sector gear 78.

In the operation of the device it will be seen that the linear measure is first adjusted to a desired degree and the scale plate is moved throughout the desired number of minutes and seconds to rotate the scale plate relative to the measure up to one full degree if necessary, and that correspondingly an angle may be readily measured in minutes, seconds and degrees. Obviously various geometric and trigonometric functions may be readily computed by means of this device with an absence of the necessity for using logarithmic functions.

It will be readily apparent that as the angle of any given mounting is changed, the end of the measure opposite the angle may slide freely through its associated mountings so that given the length of one side and two angles, or the length of two sides and one angle, the missing side or sides, or angles may be readily determined within one second of arc. Furthermore, since all readings are made from one side of the device, it will be readily understood that various mathematical functions may readily be accomplished in a mechanical manner with a minimum of effort and difficulty.

From the foregoing it will now be seen that there is herein provided a device which accomplishes all of the objects of this invention and others, including many advantages of great practical utility and commercial importance.

As many embodiments may be made of this inventive concept, and as many modifications may be made in the embodiments hereinbefore shown and described, it is to be understood that all matter herein is to be interpreted as merely illustrative and not in a limiting sense.

What I claim is—

1. An instrument for measuring lengths and angles comprising first, second and third linear measures, each having a ring at one end, first, second and third mountings each having a flat base and each pivotally mounting the ringed end of a linear measure and slidably mounting the other straight end of another measure to form a triangle, each of said other ends being freely slidable, and each of said ringed ends being movable through an arc of 180 degrees, indicia carried by each linear measure, a pair of verniers carried by each mounting adjacent said other end of said linear measure, a scale plate carried by each mounting carrying indicia comprising subdivisions of said first indicia, a pointer carried by one of said verniers movable along said scale, a micrometer carried by the other vernier having indicia comprising further subdivisions of said first indicia, whereby said second vernier may be spaced a distance from said first vernier and the resultant total read in terms of the last subdivision, means for rotating said linear measure about the pivotal mounting of said ringed units and arcuately movable scale means pivotally carried by each mounting for indicating the angular relation of each linear measure to the adjacent end of another linear measure in degrees.

2. An instrument for measuring lengths and angles comprising first, second and third linear measures, each having a ring at one end, first, second and third mountings each having a flat base and each pivotally mounting the ringed end of a linear measure and slidably mounting the other straight end of another measure to form a triangle, each of said other ends being freely slidable, and each of said ringed ends being movable through an arc of 180 degrees, indicia carried by each linear measure, a pair of verniers carried by each mounting adjacent said other end of said linear measure, a scale plate carried by each mounting carrying indicia comprising subdivisions of said first indicia, a pointer carried by one of said verniers movable along said scale, a micrometer carried by the other vernier having indicia comprising further subdivisions of said first indicia, whereby said second vernier may be spaced a distance from said first vernier and the resultant total read in terms of the last subdivision, means for rotating said linear measure about the pivotal mounting of said ringed units and arcuately movable scale means pivotally carried by each mounting for indicating the angular relation of each linear measure to the adjacent end of another linear measure in degrees, a dial carried by each mounting for indicating minutes, a second dial carried by each mounting indicating seconds, and geared means carried by each mounting for moving said graduated scale simultaneously with said dial, whereby minutes and seconds of arc are indicated by said dials, said dials, arcuate scale means, scale plates, verniers and mircometer all being carried by the same side of each mounting.

3. An instrument for measuring lengths and angles comprising first, second and third linear measures, each having a ring at one end, first, second and third mountings each having a flat base and each pivotally mounting the ringed end of a linear measure and slidably mounting the other straight end of another measure to form a triangle, each of said other ends being freely slidable, and each of said ringed ends being movable through an arc of 180 degrees, indicia carried by each linear measure, a pair of verniers carried by each mounting adjacent said other end of said linear measure, a scale plate carried by each mounting carrying indicia comprising subdivisions of said first indicia a pointer carried by one of said verniers movable along said scale, a micrometer carried by the other vernier having indicia comprising further subdivisions of said first indicia, whereby said second vernier may be spaced a distance from said first vernier and the resultant total read in terms of the last subdivision, means for rotating said linear measure about the pivotal mounting of said ringed units.

4. The structure of claim 3 wherein each vernier includes a V-shaped longitudinal groove, a vertical longitudinal channel communicating with said groove, an inverted V-shaped guide in said notch upon which said verniers may slide, a screw extending upwardly through each channel, and nuts on said screws for locking said verniers.

References Cited in the file of this patent

UNITED STATES PATENTS

| | | |
|---|---|---|
| 1,376,327 | Fischer | Apr. 26, 1921 |
| 1,900,231 | Ede | Mar. 7, 1933 |
| 2,093,048 | Ike | Sept. 14, 1937 |
| 2,143,241 | Hallenbeck | Jan. 10, 1939 |
| 2,463,649 | Sheffield | Mar. 8, 1949 |